United States Patent

[11] 3,564,257

| [72] | Inventors | Peter J. Berry<br>Itchingwood Common, Limpsfield, Surrey;<br>Bernard J. Thompson, Walton-on-Thames,<br>Surrey, England |
|---|---|---|
| [21] | Appl. No. | 170,280 |
| [22] | Filed | Jan. 31, 1962 |
| [45] | Patented | Feb. 16, 1971 |
| [73] | Assignee | Electric & Musical Industries Limited<br>Hayes, England |
| [32] | Priority | Feb. 3, 1961 |
| [33] | | Great Britain |
| [31] | | 4,254/61 |

[54] RADIATION DETECTING APPARATUS
10 Claims, 7 Drawing Figs.

[52] U.S. Cl........................................ 250/203;
102/70.2; 244/3.16; 250/83.3, 250/211; 356/141
[51] Int. Cl.......................................... F41g 7/00
[50] Field of Search............................. 315/169
(TV), 8.5, 10; 250/83.3 (IR), 203; 244/14.3;
340/174, 173; 315/169; 250/83.3 (IR), 203, 208,
220; 244/14.3; 340/174; 88/1, (IR Digest);
250/203, 211; 244/3.16

[56] References Cited
UNITED STATES PATENTS

| 3,067,283 | 12/1962 | Petritz et al.................. | 250/83.3 |
| 2,453,502 | 11/1948 | Dimnick........................ | 250/83.3 |
| 2,892,949 | 6/1959 | Hardy............................ | 244/14.3 |
| 3,015,747 | 1/1962 | Rosenberg.................. | 315/169 |
| 3,059,115 | 10/1962 | Lempicke.................... | 250/208 |
| 2,976,758 | 3/1961 | Parker.......................... | 250/203 |

*Primary Examiner*—Rodney D. Bennett, Jr.
*Assistant Examiner*—Daniel C. Kaufman
*Attorney*—Fleit, Gipple & Jacobson ABSTRACT: Apparatus for indicating the position of a radiating body moving relative to said apparatus, comprising a first lattice of elongated parallel radiation-sensitive elements, a second lattice of elongated parallel radiation-sensitive elements, means for focusing radiation on said two lattices from substantially the same point of view, the elements of the first lattice being at right angles to the elements of the second lattice from the point of view of the focusing means, first sampling means for sampling the elements of the first lattice in predetermined manner to determine which, if any, of the respective elements receives radiation, second sampling means for sampling the elements of the second lattice independently of the first sampling means in predetermined manner to determine which, if any, of the respective elements receives radiation, and output means responsive to the respective sampling means for producing output signals respectively representing the location of elements of the respective lattices receiving the radiation, wherein either or both of said sampling means comprises sequentially operable means for initially sampling the respective elements in a predetermined sequence, means for discontinuing the sequential operation of said sequentially operable means in response to a radiation signal from one of the respective elements, relocating means responsive to a decline of said radiation signal for sampling one or more of the elements in said sequence adjacent said one element until a radiation sensitive signal is obtained from one of said adjacent elements.

RADIATION DETECTING APPARATUS

This invention relates to apparatus for automatically tracking a radiating body moving relative to the apparatus, and particularly to a fuzing device incorporating such apparatus.

In some types of missiles, it is necessary to determine the optimum time at which to detonate the warhead and one measurement which is useful in calculating the instant of detonation is the angle of sight of the target with respect to the missile axis. The angle of sight of a moving target is usually measured by employing some form of autotracking radar, whereby a receiving aerial, e.g. a waveguide "dish", scans in azimuth and elevation until it locates the target by means of pulses reflected from it, then looks onto and follows the reflecting target, and angular position of the aerial in azimuth and elevation when locked on, indicating the angle of sight of the target relative to the missile. Such systems suffer from several disadvantages. Radar receivers are susceptible to "jamming." Furthermore, mechanical means must be provided for scanning the aerial. This not only imposes a severe limitation on the rate of scanning, making it difficult to follow a rapidly moving target, but also involves the use of heavy and bulky motors, whereas in missiles particularly the size and weight of the equipment must be kept to a minimum.

It is the object of this invention to reduce some at least of the difficulties mentioned above.

According to the present invention there is provided apparatus for indicating the position of a radiating body moving relative to said apparatus, comprising a first lattice of elongated parallel radiation-sensitive elements, a second lattice of elongated parallel radiation-sensitive elements, means for focusing radiation on said two lattices from substantially the same point of view, the elements of the first lattice being at right angles to the elements of the second lattice from the point of view of the focusing means, first sampling means for sampling the elements of the first lattice in predetermined manner to determine which, if any, of the respective elements is sensitized by radiation, second sampling means for sampling the elements of the second lattice independently of the first sampling means in predetermined manner to determine which, if any, of the respective elements is sensitized by radiation, second sampling means for sampling the elements of the second lattice independently of the first sampling means in predetermined manner to determine which, if any, of the respective elements is sensitized by radiation, and output means responsive to the respective sampling means for producing output signals respectively representing the location of elements of the respective lattices sensitized by the radiation.

It is to be understood that reference to a radiating body is intended to apply to bodies which radiate actively, or passively by reflecting radiation from sources outside the body.

Preferably either or both of said sampling means comprises sequentially operable means for initially sampling the respective elements in a predetermined sequence, means for discontinuing operation of said sequentially operable means in response to a radiation signal from one of the respective elements, relocating means responsive to a decline of said radiation signal for sampling one or more of the elements in said sequence adjacent said one element until a radiation sensitive signal is obtained from one of said adjacent elements.

In order that the invention may be clearly understood and readily carried into effect, it will now be described with reference to the accompanying drawings, in which:

FIG. 7 shows a block diagram of one example of the apparatus according to the invention.

Figure 1:
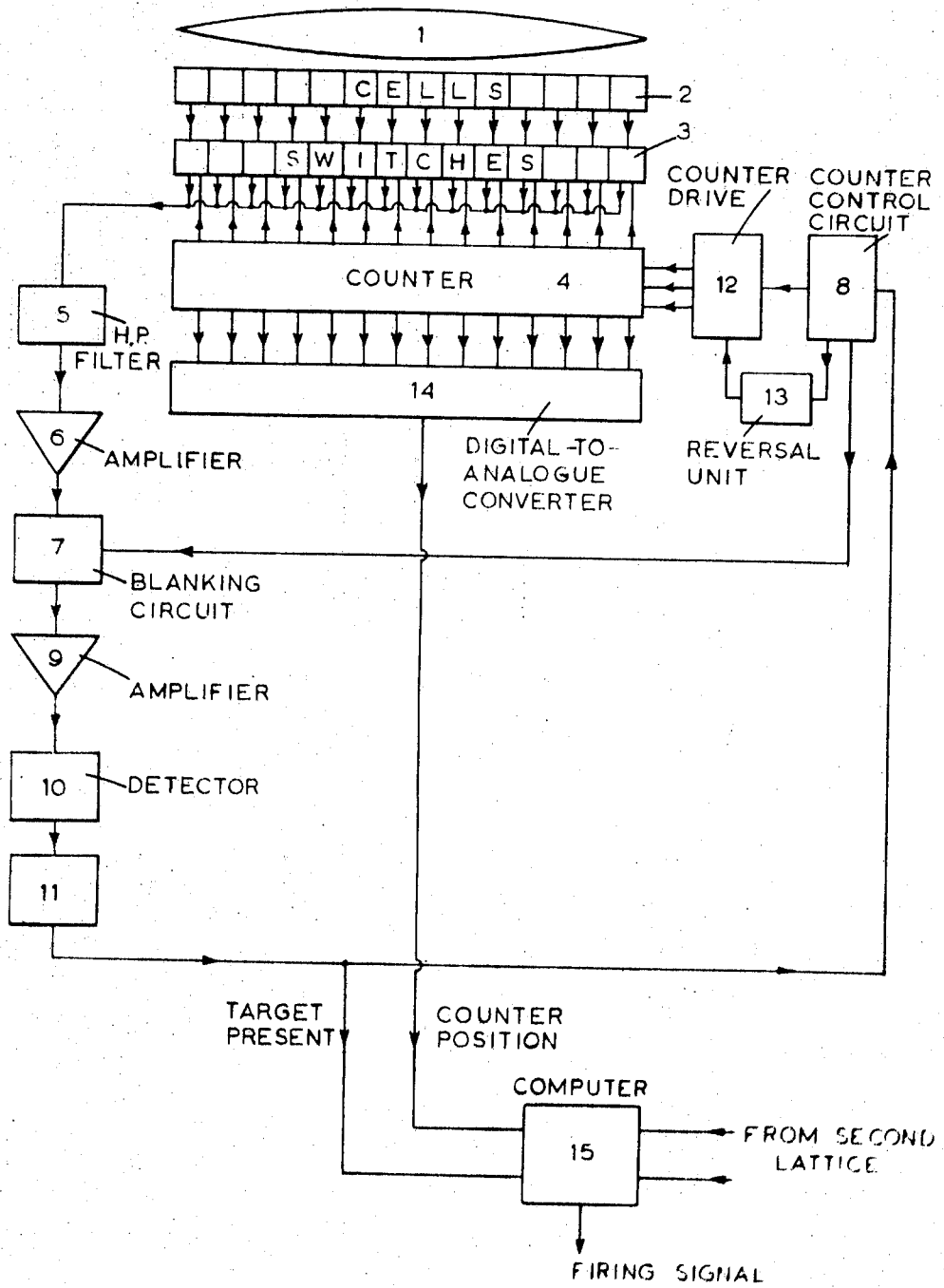
FIG. 1 shows a block diagram of one example of part of the apparatus according to the invention.
Figure 2:
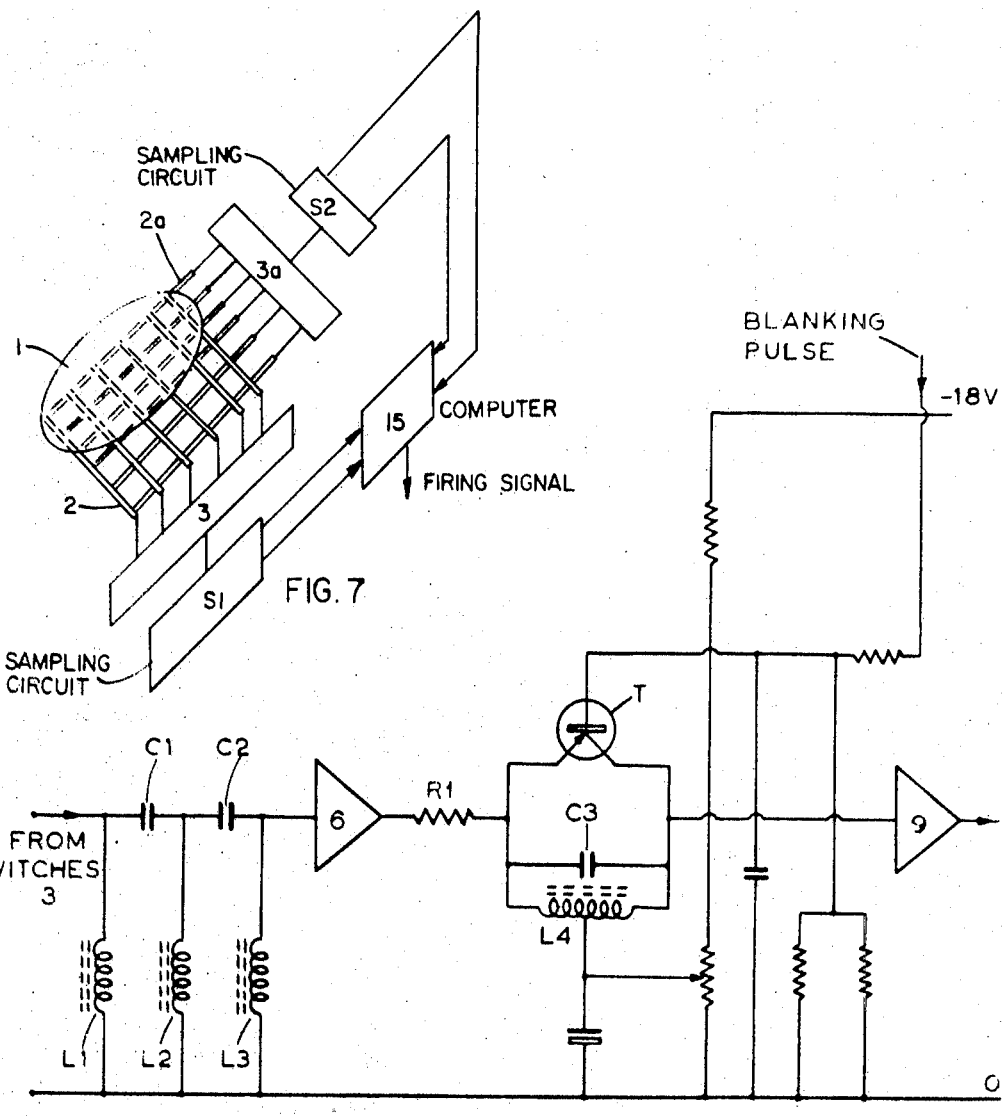
FIG. 2, 3 and 4 show in detail some of the units employed in FIG. 1.
Figure 5:
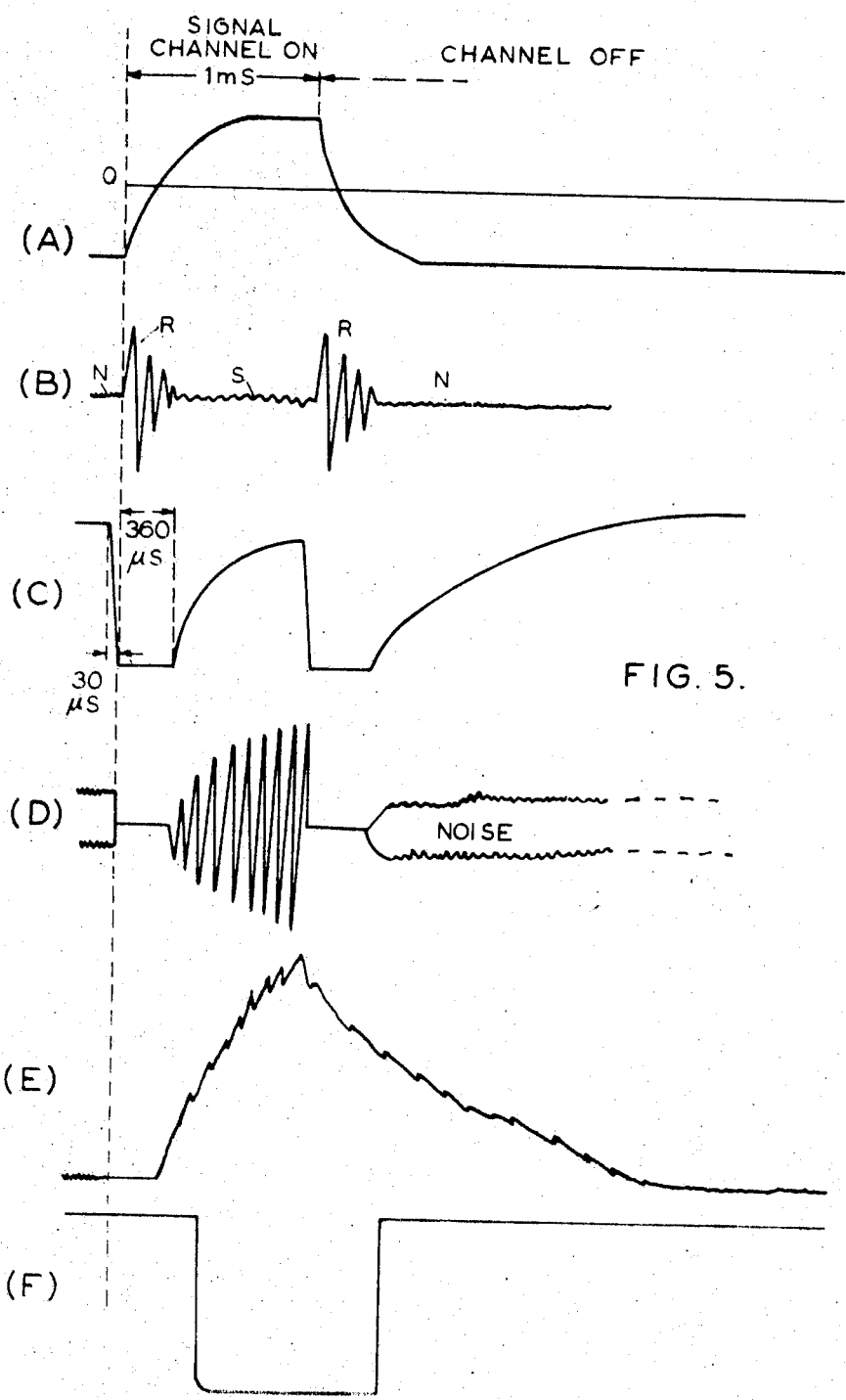
FIGS. 5 and 6 show waveforms produced by the apparatus illustrated in FIGS. 2, 3 and 4.

Referring to FIG. 1, radiations in the infrared spectrum emitted by a target are sampled at a suitable frequency, e.g. 14 Kc/s by a mechanical chopper, and focused by means of a Schmitt optical system represented diagrammatically at 1, covering an angle of ± 40° onto two lattices 2, 2a of infrared sensitive cells carried by the missile. One such lattice is indicated by the reference 2 and the other by reference 2a and consists of a number of cells $n$, e.g. 39, in the form of strips extending into the plane of the paper. The strip cells of the second lattice 2l are arranged at right angles to those of the first, and as the circuitry associated with each lattice is identical only that corresponding to lattice 2 will be described. Each lattice corresponds to a coordinate of a cartesian system, and the two lattices are so arranged in relation to the optical system, that radiation from a given source is focused on the two lattices effectively from the same viewpoint. This is achieved by positioning one lattice behind the other so that the rearward lattice can be seen in gaps between the strips of the front lattice as illustrated in FIG. 7. Alternatively the two lattices may be displaced, suitable light splitting means being provided in the optical system. Each cell is scanned in turn by a series of $n$ switches or gates 3 in the case of lattice 2 and 3a in the case of lattice 2a. The gates are controlled by respective sampling circuits denoted generally by references S1 and S2 in FIG. 7. The circuits S1 and S2 are identical and therefore only the circuit S1 will be further described. This comprises a counter 4 for controlling the gates 3 in a manner to be hereinafter described. It will be appreciated that only that cell on which the radiations are focused will produce a signal output, the particular cell being determined by the angular position of the radiation source. This signal output is applied to a high pass filter 5, amplifier 6 and blanking circuit 7. These units are shown in more detail in FIG. 2, and consist of a high pass filter network $L_1, L_2, L_3, C_1, C_2$, which is designed to pass the signal from the cell, but to reject components of the switching pulses one of which is indicated in FIG. 5A. The filter output is amplified by 6 and applied to the blanking circuit 7. As can be seen from the waveform in FIG. 5B, the output from amplifier 6 contains, in addition to the signal S from a cell and noise N, a signal R of large amplitude. This signal R is due to ringing produced in the high pass filter 5, by the switching transients in the output from 3, and the purpose of the blanking circuit 7 is to remove this ringing component. Referring to FIG. 2, the blanking circuit comprises a transistor switch T connected across a tuned circuit $C_3L_4$. When transistor T is in its "off" state, it is effectively an open circuit and the signal from amplifier 6 is fed via resistor $R_1$ to the tuned circuit. Since the center tap of the coil $L_4$ is earthed to AC the coil acts as an auto transformer and simply inverts the signal between amplifier 6 and the following amplifier 9. When the transistor is switched to its "on" state by a blanking pulse, shown in FIG. 5C and derived from a counter control unit 8 (FIG. 1) in a manner to be later described, the transistor behaves as a short circuit. The signal is thus fed via $R_1$ to both ends of the coil $L_4$ simultaneously, and as the two halves of the coil $L_4$ are in parallel between the signal and earth, they behave as a short circuit due to the mutual inductance between them, and the output of amplifier 6 is dissipated and in resistor $R_1$. With this arrangement, the switching current for the transistor T is split between the two halves of the coil $L_4$ in such a way that the E.M.F's generated by it cancel out and do not affect the output of the amplifier 9. The tuned circuit $C_3L_4$ together with the resistor $R_1$ and the output impedance of amplifier 6, and the input impedance of amplifier 9 sets the bandwidth of the whole system. The bandwidth of the first amplifier 6 is made large, as any reduction tends to increase the ringing time of the cell switch transients, and it is thus necessary to maintain a large bandwidth up to the blanking circuit 7 if the blanking period is not to be made too long. Those components shown in FIG. 2 and in other FIGS. which are not described perform functions which are evident in the drawing.

Referring again to FIG. 1, the output of amplifier 9, shown in FIG. 5D is detected at 10 to reduce the AC component due to the mechanical chopper and applied to a Schmitt trigger circuit 11, of known type. The Schmitt circuit provides a fixed output voltage as shown in FIG. 5E whenever the signal level from the detector, as shown in FIG. 5E, rises above a predetermined value,, and this signal is fed to the counter control unit 8.

Before describing the counter 4, its driver 12 and control unit 8, an explanation of their functions will first be given.

Counter 4 is an n stage ring counter or pulse commutator driven by pulses from the counter control unit 8 via the counter driver 12. Each stage of the counter controls a corresponding switch of the unit 3 so that as the counter is stepped by its drive pulses each cell 2 is connected in turn to the output line by means of its corresponding switch, as long as driving pulses are being produced by 8. Counter control unit 8 produces driving pulses only when no signal is produced by the Schmitt circuit 11. When a signal does appear, e.g. from any cell $x$, the counter control unit 8, and hence the counter 4 stops, and cell $x$ remains connected to the output line as long as it is producing a signal. If the signal now disappears, the unit 8 produces a drive pulse which steps the counter 4 in the direction in which it was last moving e.g. to the $(x + 1)^{th}$ stage. If there is no signal on the cell $(x + 1)$, counter control unit 8, in conjunction with reversal unit 13, rapidly reverses the counter 4 two stages, i.e. to the $(x - 1)^{th}$ stage, and if there is still no signal the counter proceeds to count in this direction. If at any time a signal does appear, the counting process is immediately stopped. It will be appreciated that when the signal from a cell disappears it will reappear on one of the two adjacent cells, and if the rate of change of angle of sight of the target producing the energization of the cells is not greater than the speed of the counter, a quick search of the cell on either side of the cell on which the signal last appeared will relocate the signal rapidly without the necessity of a sequential search. If a normal sequential sampling system is used with $n$ cells then the speed of the counter must be $n$ times greater than the maximum speed at which the target image crosses the cells. The proposed system however enables a counter whose maximum speed is only a little greater than that of the target to be used. The speed of the counter can thus be reduced $n$ times. In the period before the equipment is "locked on" the target is at maximum range and the sight line moves slowly so that although the counter action is sequential its slow speed is not important. Whether the searching is performed sequentially or by the above "quick search" operation, it can be seen that the position of the target relative to the missile carrying the cells 2 is constantly tracked and indicated by the position of the count in the counter 4. The counter 4 is connected to a digital to analogue converter 14 whereby the count number at any instant is converted to a voltage proportional to the coordinate value. The signal from the converter 14 is applied to a computer 15. The signal may, if desired, be gated into the computer by the "target present" signal from the Schmitt trigger 11. A second input to the computer is derived from the counter corresponding to the second lattice of cells 2, after conversion to analogue form, and it will be appreciated that the two analogue signals represent the position of the target relative to the missile in two directions at right angles. From these two values, the computer calculates the angle of sight of the target, and the rate of change of that angle, and hence the optimum moment of detonation to ensure destruction of the target.

Figure 3:
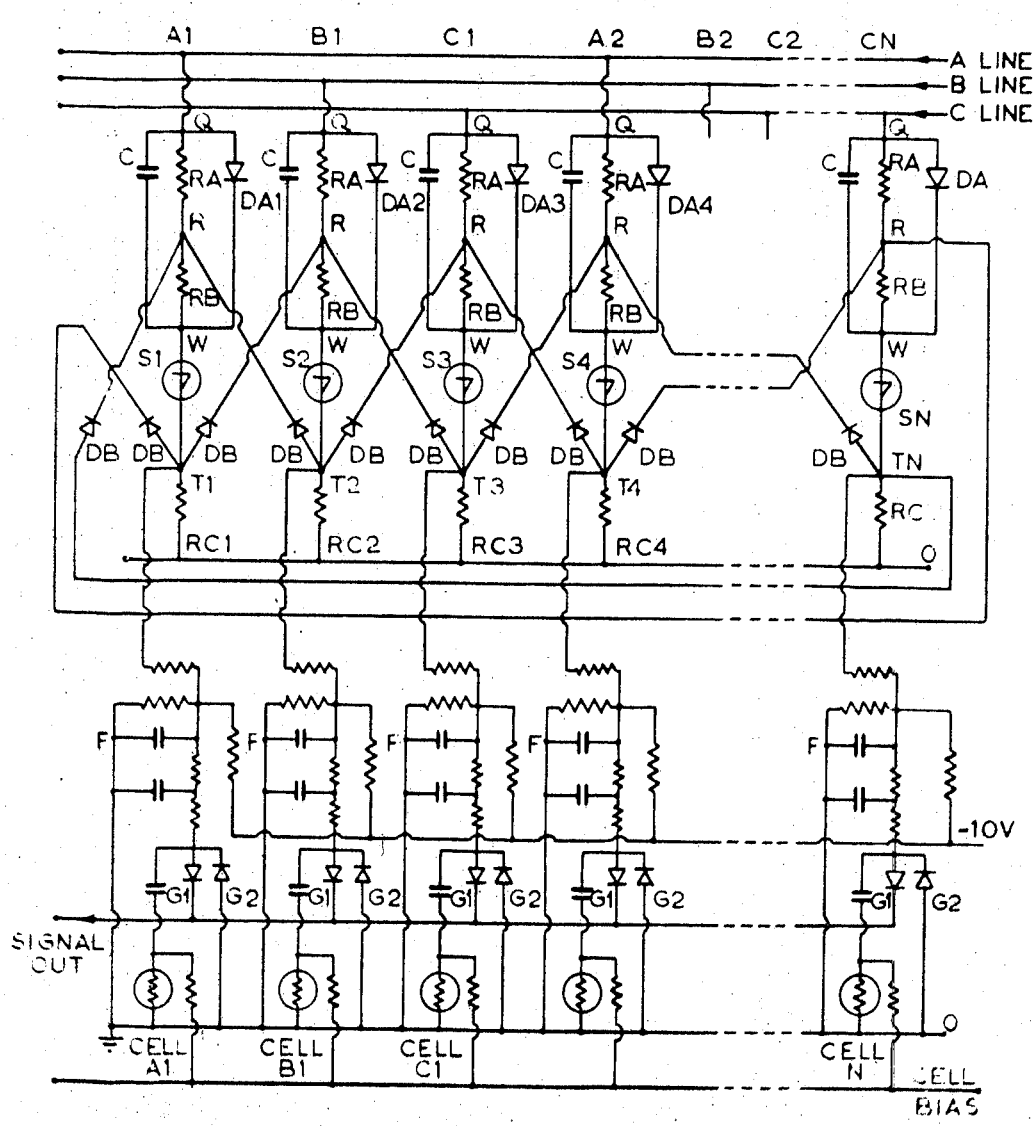

Referring now to FIG. 3, the $n$ stage ring counter 4 and switches 3 are shown in more detail. As all stages are identical, the same reference numbers are used in each. It will be remembered from the description of the general operation, that the counter is required to be reversible. Reversible counters e.g. using Eccles-Jordan circuits, are well known. They are, however, bulky, and as space is very limited in a missile a counter employing four-layer diodes as the active elements is employed. These diodes are PNPN semiconductor devices, and their characteristics are as follows. When subjected to a forward voltage, the diode will not conduct until a certain voltage, now known as the striking voltage, which in the circuit to be described is about 20 volts, is reached. It then conducts and behaves almost as a closed switch, and will remain in this conducting condition provided that its current remains above the holding value, which is about 10 mm. for the device used in this circuit. When the current falls below this value it reverts to the open circuit condition.

The counter is driven by three supply lines A, B and C each energized by a different stage of a three stage reversible commutating device denoted by reference 12 on FIG. 1. The device 12 may be a multicathode gas discharge device or one using three Eccles-Jordan circuits connected in reversible counter manner, and as such devices are well known, only a brief description will be given. The direction of shift in the commutating device is also controlled in known manner by the reversal unit 13, which is in the form of a bistable device. Thus, in one condition of the bistable device, when a shift pulse is applied to the device 12 the shift from the respective stage to the next stage in the device 12 occurs in one sense while in the other condition of the bistable device the discharge moves from the respective stage to the next in the opposite sense. Therefore by controlling the bistable device by means of "reversal" pulses derived from the counter control unit, commutation can be performed in either direction, so that the counter 4 can be caused to count in either direction, as will be described.

Referring then to lines A, B and C, only one line is energized at any time, and the energization can be moved to either of the adjacent lines by means of the three stage counter. The remaining lines are earthed. In the present circuit, the "on" line is a at 15 volts and the other two lines at zero volts, and each line is connected to every third stage of the counter as shown in the drawing. However, as the striking voltage of the four-layer diodes S1, S2, S3 ...... Sn is 20 volts, this 15 volts is insufficient to cause the diodes connected to this line to strike. When the circuit is switched on, one of the diodes S will strike to commence counting, and provision is made to ensure that one and one only of the diodes will strike. Such provision may be of known form, but preferably it takes the form of a nonlinear impedance between the negative potential source and the joined ends of the resistors RC1, RC2, RC3 ...., which would not be connected to earth in this case. This impedance which may include a transistor, is so arranged that it has a high incremental impedance if, after switching one, or more than one of the diodes S conduct, the incremental impedance being dependent upon the total current in the resistors RC1, RC2, RC3 .... On the other hand, the incremental impedance of the nonlinear resistance is arranged to be low when one and only one diode S is conducting, the counter being stable in this condition of the nonlinear impedance, but being unstable when the incremental impedance is high so that it will always tend to assume and remain in a stable state when only one of the diodes S is conducting, the join of the resistors RC1, RC2, RC3 .... is at approximately earth potential. The nonlinear impedance is moreover preferably shunted by a capacity to deal with surge currents.

In the present example assume that the diode S2 in stage B1 has been struck and that line B is energized. Then the points Q, R, W and T2 in stage B1 are all at approximately 15 volts. 15mA is drawn through diode DA2, diode S2 and resistor RC2 and a 15 volt output is derived from point T2. In any other stage which is connected to the energized line B, e.g. B2, points Q, R and W are at 15 volts and the point T at zero, the resultant 15 volts across the diode being insufficient to strike it. In a stage which is connected to an unenergised line and is not adjacent to an "on" stage, e.g. stage A2, all voltages are zero. In a stage which is connected to an unenergized line and which is adjacent to an "on" stage, e.g. stages A1 and C1, the points R in these two stages are raised to 15 volts due to the connection via diodes DB to the point T2, thus charging condensers C to 15 volts via resistors RB. Points Q remain at zero and the diodes S1 and S3 still remain off since they have only 15 volts across them. Points W are, however, 15 volts positive with respect to points Q and these points are joined by capacitors C. When, therefore, stage B1 is switched off, this voltage will not decay instantly, and if line A is now energized, point Q in stage A1 rises to 15 volts, and point W attempts to rise above it by 15 volts, thus putting 30 volts across the four layer diode S1. The voltage at W does not in fact reach 30 volts since the diode S1 strikes at 20 volts and discharges the condenser C. Similarly if line C instead of line A had been energized after line B, diode S3 would have struck. In effect, a stage which is on primes one stage on either side of it, and a primed stage strikes when energized by its line A, B or C. Thus it can be seen that by cyclically energizing the lines A, B and C in the appropriate direction by means of a reversible three stage commutating device, the multistage counter in FIG. 3 will count in either direction. The outputs from points T are passed through RC networks F which reduce them to a suitable level and remove the high frequency components of the waveform. This produces the switching pulse in FIG. 5A where an individual channel is shown being switched on and off again. This pulse is applied to two diodes $G_1$ and $G_2$ one of which viz $G_1$ is biassed "on" when a switch pulse is present, to pass the signal from the radiation sensitive cell to the output line. The individual cells are denoted in FIG. 3 by the references A1, B1 etc., and each pair of diodes $G_1$ and $G_2$ correspond to one of switches 3. In the absence of a switch pulse, diode $G_1$ is biassed "off" to inhibit any signal, and diode $G_2$, which is reversely connected, is switched on to short out any signal from the cell, so preventing very large unwanted signals from breaking through the switch. Whereas the counter described requires a relatively complicated driving arrangement and the counter itself is greatly simplified. Thus when a large number of stages is required the total number of components is much reduced. This saves space and makes for greater reliability. This circuit also has the advantage that only the "on" stage draws current whereas in most other arrangements all stages drain current from the supply line. The dissipation in the unit is therefore much reduced.

Figure 4:
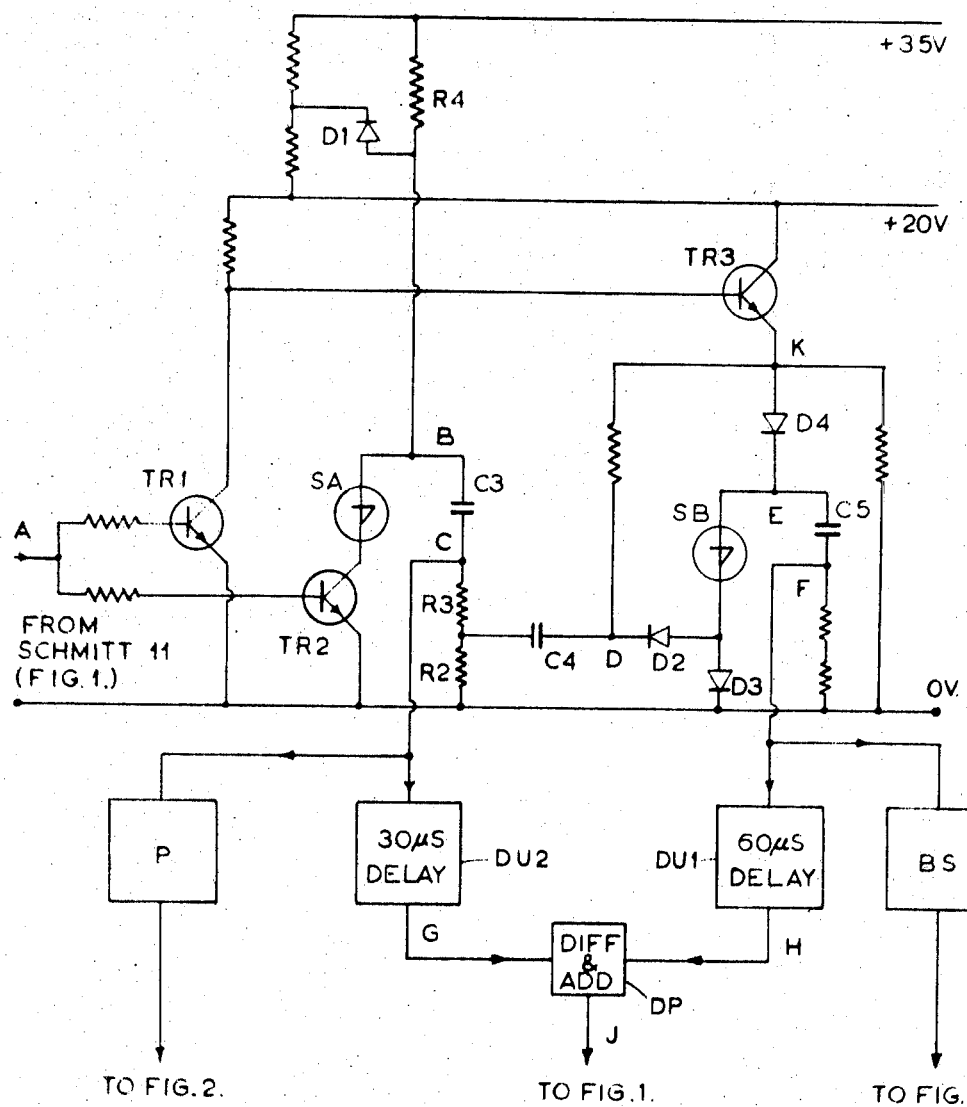

Referring now to FIG. 4, which illustrates the counter control unit and reversal unit shown. The function of this unit is to produce (a) the a) timing pulses to drive the three stage counter, (b) reversal pulses to switch the bistable element controlling the direction of count of the three stage counter i.e. to perform the "quick" search referred to above, and (c) the blanking pulses applied to the transistor switch in Fig. 2.

Figure 6:
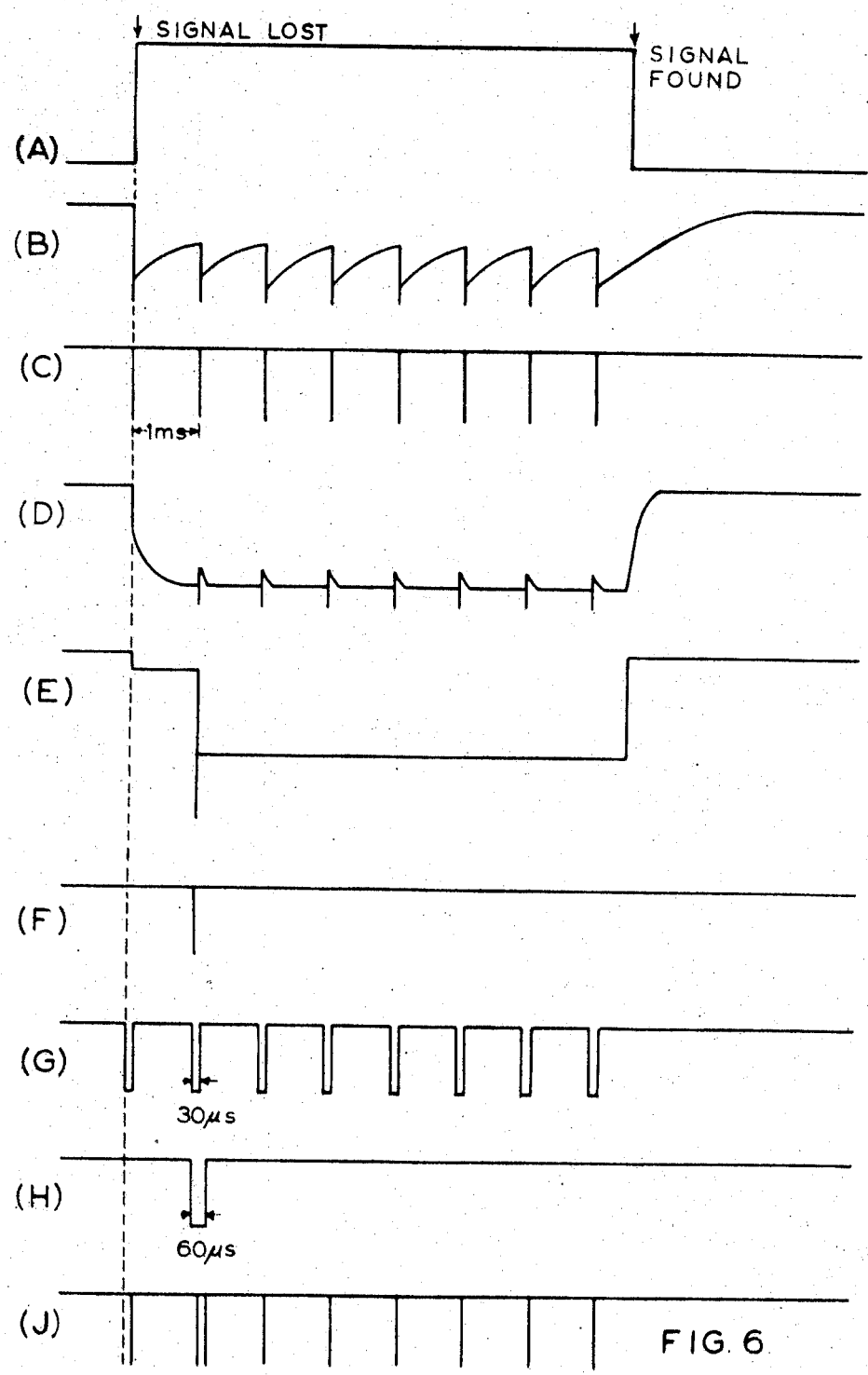

When a signal has been obtained from one of cells 2 and there is an output from the Schmitt circuit 11 (FIG. 1) transistor TR2 is switched off. The four layer diode SA is thus prevented from conducting, no timing pulses are produced and the counter 4 (FIGS. 1 and 3) is at rest i.e. locked on the target. The voltage at B rises to about +27 volts the upper limit being set by the diode D1 charging capacitor C3. When the signal disappears i.e. the target is lost, TR2 is switched on and SA strikes, C3 is discharged via SA, TR2, R3 and R2, and the discharge current flowing through R3 and R2 generates a pulse at point C. When the discharge current falls below the holding value of SA, it switches off and C3 recharges through R4 until SA again strikes, generating another pulse. This process continues until the target is found and the signal produced by the Schmitt circuit switches TR2 off. The waveforms produced at points A, B and C are as shown in FIG. 6, the time constants of the circuit being chosen to give a pulse interval of as shown by waveform C. These pulses are used to trigger a pulse generator indicated at P which produces the blanking pulses to control transistor switch T (FIG. 2). As will become apparent, these pulses are +µs earlier than the switch pulses, to give the blanking circuit time to operate before ringing occurs.

Referring now to the right-hand side of FIG. 4, when a signal is present, transistor TR3 is switched "on" since TR1 is switched off by the output of the Schmitt circuit, so that the base of TR3 is at a sufficiently high potential. The point E is then at about 19 volts and the diode D2 is biassed "off" by the voltage at point K. No pulses are being produced by SA, and the voltage across SB is insufficient to strike it. When TR3 is switched "off" i.e., when the signal is lost, point K is no longer held at 19 volts and C4 discharges, allowing diode D2 to conduct. However, as this discharge takes a few hundred microseconds, the pulse which first arrives at point D from point C via C4 is not passed to S$b$. Since capacitance C5 is still charged as D4 is now cutoff point E remains at 19 volts although the voltage at point K has fallen. The second pulse to arrive at point D from point C is passed through D2 which now conducts and forces the voltage at the bottom of SB down. The voltage on SB is therefore the sum of the pulse passed by D2 and the 19 volts of point E. The second pulse therefore causes SB to strike, discharging C5 and generating an output at point F. The condenser C5 does not completely discharge before SB switches "off" again, so that when SB does switch "off," the voltage at E rises to a level determined by the residual charge on C5. This voltage is not, however, sufficient for subsequent pulses to strike SB and C5 remains charged at this level until the signal is again found and TR3 is made to conduct. The waveforms appearing at points D, E and F are shown in FIG. 6. The single pulse produced each time the signal is lost is the the reversal pulse used to trigger the bistable circuit BS (reversal unit 13 in FIG. 1) controlling the direction of the counting circuit. The pulse F is also used to trigger a 60µs delay unit DU1 e.g. a so-called "one-shot" multivibrator to produce the pulse shown in FIG. 6H. Similarly the pulse train C produced by diode SA is used to trigger a 30µs delay unit DU2 to produce waveform G. The waveforms G and H are differentiated to extract their trailing edges, and combined to give the pulse train shown in FIG. 6J, which controls the three stage ring counter, the differentiating and combining being effected in a circuit DP. The first pulse of this train steps the counter 12 (FIG. 1) and hence the counter 4 one place in the direction in which it was previously counting i.e. from stage $x$ of counter 4 to stage $x+1$. The reversal pulse F reverses the count direction a short time (30µs) before the second count pulse of train J. This second pulse is closely followed by a third count pulse with the result that the counter 4 is rapidly moved back two places i.e. to the ($x-1$) stage and then proceeds to stages ($x-2$), ($x-3$) etc., until the occurrence of a signal halts the count.

Furthermore, although the invention has been described in relation to a fusing device it is not limited to such an application, and may find other uses, e.g. in collision avoidance systems or in automatic navigation systems.

The radiation sensitive elements may in some cases be sensitive to radiation in the visible range or to radiation in the ultraviolet range.

We claim:

1. Apparatus for indicating the position of a radiating body moving relative to said apparatus, comprising a first lattice of elongated parallel radiation-sensitive elements, a second lattice of elongated parallel radiation-sensitive elements, means for focusing radiation on said two lattices from substantially the same point of view, the elements of the first lattice being at right angles to the elements of the second lattice from the point of view of the focusing means, first sampling means for sampling the elements of the first lattice in predetermined manner to determine which, if any, of the respective elements receives radiation, second sampling means for sampling the elements of the second lattice independently of the first sampling means in predetermined manner to determine which, if any, of the respective elements receives radiation, and output means responsive to the respective sampling means for producing output signals respectively representing the location of elements of the respective lattices receiving the radiation, wherein either or both of said sampling means comprises sequentially operable means for initially sampling the respective elements in a predetermined sequence, means for discontinuing the sequential operation of said sequentially operable means in response to a radiation signal from one of the respective elements, relocating means responsive to a decline of said radiation signal for sampling one or more of the elements in said sequence adjacent said one element until a radiation sensitive signal is obtained from one of said adjacent elements.

2. Apparatus according to claim 1, wherein said radiation sensitive elements are sensitive to infrared radiation.

3. Apparatus according to claim 1, wherein said relocating means comprises means for conditioning said sampling means to sample the element next-after said one element and thereafter to sample the element next- before said one element, unless a radiation sensitive signal is obtained from said next-after element.

4. Apparatus according to claim 3, wherein said sequentially operable means is reversible so that said sequentially operable means can be caused to sample said elements in said sequence in either a forward sampling sense or a reverse sampling sense, and wherein said relocating means comprises means for restarting operation of said sequentially operable means for one step in the same sampling sense as that which applied before the previous operation of said sequentially operable means was discontinued and, unless operation of said sequentially operable means is again discontinued by a radiation signal from a said next-after element, for thereafter reversing said sequentially operable means so that sampling of the elements in said sequence is carried out in the reverse sense until a radiation signal is obtained from another element.

5. Apparatus according to claim 4, wherein said relocating means comprises means responsive to a decline of the radiation signal from said one element for emitting a train of pulses until another radiation signal is produced, said pulse emitting means being coupled to said sequentially operable means and said sequentially operable means being responsive to said pulse emitting means to produce step by step operation of said sequentially operable means, and said relocating means further comprising a trigger device which reverses the operation of said sequentially operable means after the occurrence of the first and before the occurrence of the next pulse of such train.

6. Apparatus according to claim 4, wherein said sequentially operable means is operable in steps and the first two steps of said sequentially operable means after reversal thereof have a smaller time separation then subsequent adjacent steps.

7. Apparatus according to claim 1, wherein said sequentially operable means comprises a ring counter having a plurality of stages connected in cyclic order to at least three input terminals, and reversible commutating means is provided to apply shift pulses in cyclic order in either sense to said input terminals, whereby said counter may be caused to count in either sense.

8. Apparatus according to claim 1, wherein said sequentially operable means comprises a ring counter, each stage of which comprises a four-layer diode.

9. Apparatus according to claim 8, wherein said ring counter is so arranged that all but one of said diodes has a high impedance state at any instant.

10. Apparatus for indicating the position of a radiating body relative to said apparatus comprising an array of radiation-sensitive elements, means for focusing radiation from said body on to said elements at a position dependent on that of said body, sampling means for sampling said elements in a predetermined manner to determine which, if any, of said elements is receiving radiation and output means responsive to said sampling means for producing an output signal representing which of said elements is receiving radiation, said sampling means including sequentially operable means for initially sampling said elements in a predetermined sequence, means for discontinuing the sequential operation of said sequentially operable means in response to a radiation signal generated by one of said elements on receipt of radiation, and relocating means responsive to a decline of said radiation signal for sampling at least one element before and after said one element in said sequence.